No. 10,796. PATENTED APR. 18, 1854.
J. H. FAIRCHILD & S. RICHARDSON.
MACHINE FOR WASHING ROOTS.
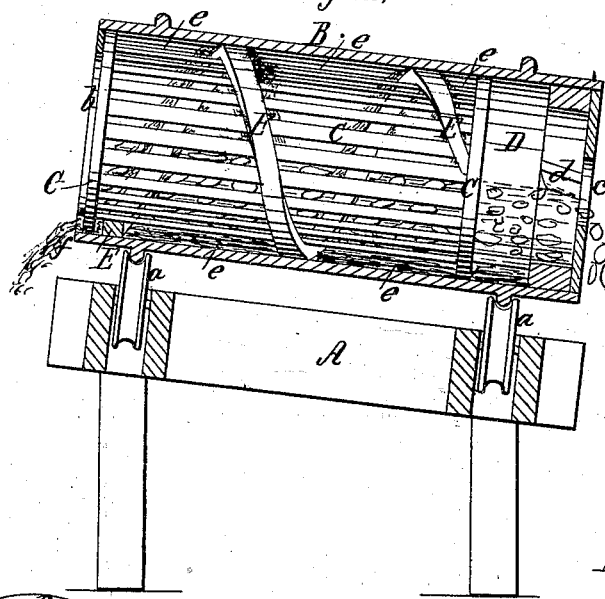
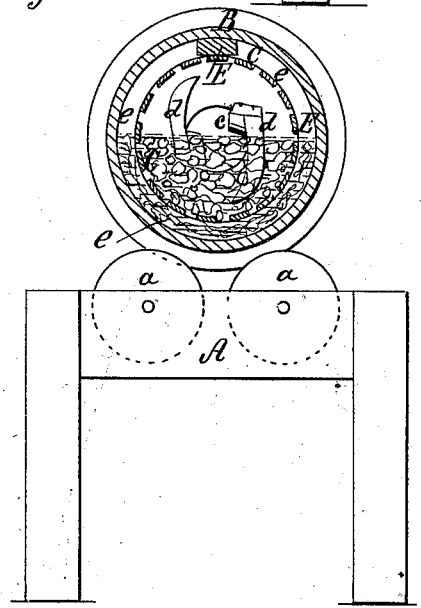
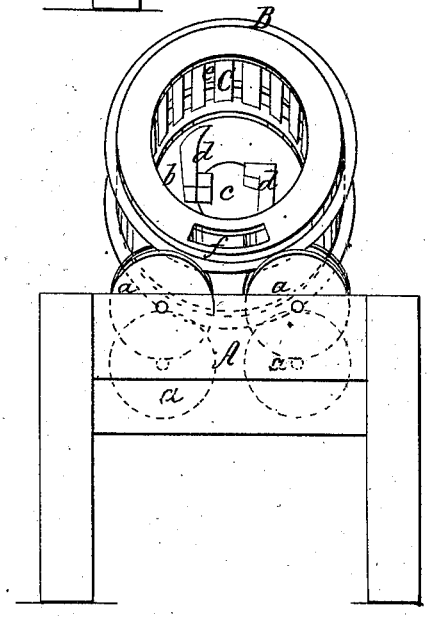

UNITED STATES PATENT OFFICE.

J. H. FAIRCHILD AND S. RICHARDSON, OF JERICHO, VERMONT.

POTATO-WASHING MACHINE.

Specification of Letters Patent No. 10,796, dated April 18, 1854.

*To all whom it may concern:*

Be it known that we, J. H. FAIRCHILD and SYLVANUS RICHARDSON, both of Jericho, in the county of Chittenden and State of Vermont, have invented a new and useful Improvement in Machines for Washing Potatoes and other Roots; and we do hereby declare that the following is a full, clear, and exact description of the same, reference being had to the accompanying drawings, forming part of this specification, in which—

Figure 1 is a vertical longitudinal section of the machine, as in operation. Fig. 2, is a vertical transverse section of the same, and Fig. 3, is an end elevation.

The nature of our invention consists in the employment within an outer revolving cylinder of an inner slatted washing and discharging cylinder having a spiral thread placed around its outer periphery, the said cylinder being somewhat smaller in diameter and shorter in length than the outer water cylinder in which it is placed and secured fast, the screw thread occupying the space or chamber formed between the inner periphery of the water cylinder and the outer periphery of the slatted cleansing cylinder, this arrangement rendering the operation of removing the dirt from the roots perfect and effecting their discharge independent of the dirt and water at the proper end of the machine and simultaneous therewith the screw by its peculiar arrangement collects the dirt, which has been removed from the roots and caused to fall between the slats into the outer cylinder, and carries it around to the opposite end of the machine and effects its discharge. Thus the roots are kept free from dirt and foreign substances after being once washed and the dirt (or the dirt and water) discharged and the machine prepared for a new operation and a fresh supply of water to be introduced at the time when other roots are placed into the machine.

To enable other skilled in the art to make and use our invention we will proceed to describe its construction and operation.

A, represents an inclined bench having a series of rollers *a, a, a, a,* arranged on its top, as shown in Fig. 1, for the outer cylinder B, to rest and revolve upon, as shown in the different figures of the drawing. The cylinder B, is closed at its sides, but has an opening at each end, that *b*, serving as the hopper or feed passage and that *c*, as the discharge. At the discharge, stops *d, d,* of the shape shown in the drawing, Figs. 2 and 3, are placed, they serving to keep the roots longer in contact with the cleansing surface and yet allowing of their gradual escape after being cleansed. This outer chamber is made to revolve by means of band or other gearing.

C, is the inner slatted cleansing cylinder, secured inside the cylinder B, there being a chamber *e*, formed between these cylinders for the dirt and other foreign matter to fall into as it is separated from the potatoes or other roots, the dirt escaping into this chamber between the slats. The cylinder C, is made somewhat shorter than the cylinder B, for the purpose of forming a space D, for the washed roots to escape into before being discharged. The roots are fed into the cylinder C, through the passage *b*, and are stripped of all foreign matter by the slats and water as the two cylinders revolve rapidly, the roots as fast as they are cleansed falling into the chamber D, and escaping through the passage *c*, as seen in drawing.

E, is the spiral or screw thread passing around the outer periphery of the inner cylinder C, and occupying space between the two cylinders, as seen in the drawing, Figs. 1 and 2. This thread is so placed around the cylinder C, that it collects the dirt in the revolution of said cylinder and causes it to be forced gradually toward the feed end of the outer cylinder and be discharged through the opening *f*, seen in Figs. 1 and 2. By referring to Fig. 1 the manner in which this screw carries the dirt around to the opening *f*, will be seen clearly, the screw thread being shown in operation and dirt and water represented as collected around it, and in the same figure the manner in which the potatoes or other roots are discharged after being cleansed by the slatted cylinder will be clearly seen, potatoes or roots being represented as undergoing the washing operation and in the act of passing from the machine through the passage *c*.

What we claim as our invention and desire to secure by Letters Patent is—

The manner herein described of constructing the machine with an outer solid revolving cylinder B, for containing water and catching the dirt removed from the roots, and with an inner slatted cylinder which is secured fast to the outer cylinder and revolves with it, for removing the dirt and foreign matter from the roots and discharging them in a clean state at one end of the machine, in combination with the spiral or screw thread placed in a spiral manner between the two cylinders for the purpose of separating the dirt from the washed roots and effecting its discharge simultaneous with the discharge of the roots at the opposite end of the machine through the passage $f$, substantially as herein fully set forth and specified.

J. H. FAIRCHILD.
SYLVANUS RICHARDSON.

Witnesses:
   DAVID FISH,
   DENNISON BLISS.